(12) United States Patent
Rhoads

(10) Patent No.: US 8,027,663 B2
(45) Date of Patent: Sep. 27, 2011

(54) WIRELESS METHODS AND DEVICES EMPLOYING STEGANOGRAPHY

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 818 days.

(21) Appl. No.: 11/875,551

(22) Filed: Oct. 19, 2007

(65) Prior Publication Data

US 2008/0125083 A1 May 29, 2008

Related U.S. Application Data

(62) Division of application No. 09/479,304, filed on Jan. 6, 2000, now Pat. No. 7,522,728, which is a division of application No. 09/172,324, filed on Oct. 13, 1998, now Pat. No. 6,064,737, which is a division of application No. 08/637,531, filed on Apr. 25, 1996, now Pat. No. 5,822,436.

(51) Int. Cl.
*H04W 88/02* (2009.01)

(52) U.S. Cl. ...................................... 455/410

(58) Field of Classification Search .......... 455/410, 455/426.2; 380/23, 252; 713/176; 382/100; 370/493, 495; 375/200, 206; 445/410
See application file for complete search history.

(56) References Cited

U.S. PATENT DOCUMENTS

| | | | |
|---|---|---|---|
| 3,004,104 A | 10/1961 | Hembrooke | |
| 3,406,344 A | 10/1968 | Hopper | |
| 3,586,781 A | 6/1971 | Jones | |
| 5,084,891 A | 1/1992 | Ariyavisitakul | |
| 5,103,459 A | 4/1992 | Gilhousen et al. | |
| 5,203,902 A | 4/1993 | Murkens | |
| 5,392,356 A | 2/1995 | Konno | |
| 5,430,760 A | 7/1995 | Dent | |
| 5,559,559 A * | 9/1996 | Jungo et al. | 348/432.1 |
| 5,574,962 A * | 11/1996 | Fardeau et al. | 455/2.01 |
| 5,612,974 A | 3/1997 | Astrachan | |
| 5,613,004 A | 3/1997 | Cooperman et al. | |
| 5,621,800 A | 4/1997 | Weng | |
| 5,687,191 A | 11/1997 | Lee et al. | |
| 5,721,788 A * | 2/1998 | Powell et al. | 382/100 |
| 5,745,569 A | 4/1998 | Moskowitz et al. | |
| 5,761,606 A | 6/1998 | Wolzien | |
| 5,764,763 A | 6/1998 | Jensen | |
| 5,774,452 A | 6/1998 | Wolosewicz | |
| 5,799,082 A | 8/1998 | Murphy et al. | |
| 5,822,360 A | 10/1998 | Lee et al. | |
| 5,822,436 A | 10/1998 | Rhoads | |
| 5,872,531 A | 2/1999 | Johnson | |
| 5,987,127 A * | 11/1999 | Ikenoue et al. | 358/401 |
| 6,064,737 A | 5/2000 | Rhoads | |
| 6,111,954 A | 8/2000 | Rhoads | |
| 6,252,963 B1 | 6/2001 | Rhoads | |

(Continued)

OTHER PUBLICATIONS

U.S. Appl. No. 09/818,533, filed Mar. 28, 2001, Geoffrey B. Rhoads.

(Continued)

*Primary Examiner* — Diane Mizrahi

(57) ABSTRACT

A wireless device includes a data capture system, a radiant-energy data transmission system, and a steganographic encoder that hides a plural-bit auxiliary code within data captured by the data capture system prior to its transmission by the data transmission system. An illustrative system, operable with audio input data, is a cell phone that steganographically encodes a user's voice. In some arrangements the steganographic encoding depends on data wirelessly received from a remote location. A variety of other arrangements and systems are also detailed.

15 Claims, 4 Drawing Sheets

MEAN-REMOVED HISTOGRAMS OF
FIRST DERIVATIVES (OR SCALER GRADIENTS
IN THE CASE OF AN IMAGE)

U.S. PATENT DOCUMENTS

| | | |
|---|---|---|
| 6,278,781 B1 | 8/2001 | Rhoads |
| 6,301,360 B1 * | 10/2001 | Bocionek et al. ............... 380/28 |
| 6,343,138 B1 * | 1/2002 | Rhoads ......................... 382/100 |
| 6,343,738 B1 * | 2/2002 | Ogilvie ......................... 235/381 |
| 6,438,231 B1 | 8/2002 | Rhoads |
| 6,751,320 B2 | 6/2004 | Rhoads |
| 6,968,057 B2 | 11/2005 | Rhoads |
| 7,103,197 B2 | 9/2006 | Rhoads |
| 7,113,596 B2 | 9/2006 | Rhoads |
| 7,116,781 B2 | 10/2006 | Rhoads |
| 7,171,018 B2 * | 1/2007 | Rhoads et al. ............... 382/100 |
| 7,248,685 B2 * | 7/2007 | Martin ..................... 379/207.01 |
| 7,362,781 B2 | 4/2008 | Rhoads |
| 7,505,605 B2 * | 3/2009 | Rhoads et al. ............... 382/100 |
| 7,522,728 B1 | 4/2009 | Rhoads |
| 7,715,446 B2 | 5/2010 | Rhoads |
| 2001/0010730 A1 | 8/2001 | Rhoads |
| 2003/0012403 A1 * | 1/2003 | Rhoads et al. ............... 382/100 |
| 2003/0040326 A1 | 2/2003 | Levy et al. |
| 2004/0022444 A1 | 2/2004 | Rhoads |
| 2005/0058319 A1 * | 3/2005 | Rhoads et al. ............... 382/100 |
| 2008/0125083 A1 | 5/2008 | Rhoads |
| 2008/0293381 A1 | 11/2008 | Rhoads |
| 2008/0300011 A1 | 12/2008 | Rhoads et al. |
| 2009/0116683 A1 | 5/2009 | Rhoads |
| 2010/0296526 A1 | 11/2010 | Rhoads |

OTHER PUBLICATIONS

U.S. Appl. No. 09/986,170, filed Nov. 7, 2001, Geoffrey B. Rhoads.
Sep. 29, 2010 Office Action in Canadian Application No. 2,483,419, 3 pages.

* cited by examiner

MEAN-REMOVED HISTOGRAMS OF
DIFFERENCE SIGNAL AND KNOWN EMBEDDED
CODE SIGNAL

MEAN-REMOVED HISTOGRAMS OF
FIRST DERIVATIVES (OR SCALER GRADIENTS
IN THE CASE OF AN IMAGE)

WIRELESS METHODS AND DEVICES EMPLOYING STEGANOGRAPHY

RELATED APPLICATION DATA

This application is a division of application Ser. No. 09/479,304, filed Jan. 6, 2000 (now U.S. Pat. No. 7,522,728), which is a division of application Ser. No. 09/172,324 (now U.S. Pat. No. 6,064,737) filed on Oct. 13, 1998, which is a division of Ser No. 08/637,531 (now U.S. Pat. No. 5,822,436) filed on Apr. 25, 1996. These applications are each incorporated by reference.

TECHNICAL FIELD

The present invention relates to wireless communication systems, such as cellular systems and PCS systems, and more particularly relates to methods involving use of steganogaphically encoded data in conjunction with such systems.

BACKGROUND AND SUMMARY OF THE INVENTION (For expository convenience, this disclosure generally refers to cellular telephony systems. However, it should be recognized that the invention is not so limited, but can be used with any wireless communications device, whether for voice or data; analog or digital.)

In the cellular telephone industry, hundreds of millions of dollars of revenue is lost each year through theft of services. While some services are lost due to physical theft of cellular telephones, the more pernicious threat is posed by cellular telephone hackers.

Cellular telephone hackers employ various electronic devices to mimic the identification signals produced by an authorized cellular telephone. (These signals are sometimes called authorization signals, verification numbers, signature data, etc.) Often, the hacker learns of these signals by eavesdropping on authorized cellular telephone subscribers and recording the data exchanged with the cell cite. By artful use of this data, the hacker can impersonate an authorized subscriber and dupe the carrier into completing pirate calls.

In the prior art, identification signals are segregated from the voice signals. Most commonly, they are temporally separated, e.g. transmitted in a burst at the time of call origination. Voice data passes through the channel only after a verification operation has taken place on this identification data. (Identification data is also commonly included in data packets sent during the transmission.) Another approach is to spectrally separate the identification, e.g. in a spectral subband outside that allocated to the voice data.

Other fraud-deterrent schemes have also been employed. One class of techniques monitors characteristics of a cellular telephone's RF signal to identify the originating phone. Another class of techniques uses handshaking protocols, wherein some of the data returned by the cellular telephone is based on an algorithm (e.g. hashing) applied to random data sent thereto.

Combinations of the foregoing approaches are also sometimes employed.

U.S. Pat. Nos. 5,465,387, 5,454,027, 5,420,910, 5,448,760, 5,335,278, 5,345,595, 5,144,649, 5,204,902, 5,153,919 and 5,388,212 detail various cellular telephone systems, and fraud deterrence techniques used therein. The disclosures of these patents are incorporated by reference.

As the sophistication of fraud deterrence systems increases, so does the sophistication of cellular telephone hackers. Ultimately, hackers have the upper hand since they recognize that all prior art systems are vulnerable to the same weakness: the identification is based on some attribute of the cellular telephone transmission outside the voice data. Since this attribute is segregated from the voice data, such systems will always be susceptible to pirates who electronically "patch" their voice into a composite electronic signal having the attribute(s) necessary to defeat the fraud deterrence system.

To overcome this failing, one embodiment steganographically encodes the voice signal with identification data, resulting in "in-band" signaling (in-band both temporally and spectrally). This approach allows the carrier to monitor the user's voice signal and decode the identification data therefrom.

In one embodiment, some or all of the identification data used in the prior art (e.g. data transmitted at call origination) is repeatedly steganographically encoded in the user's voice signal as well. The carrier can thus periodically or aperiodically check the identification data accompanying the voice data with that sent at call origination to ensure they match. If they do not, the call is identified as being hacked and steps for remediation can be instigated such as interrupting the call.

In certain embodiments, a randomly selected one of several possible messages is repeatedly steganographically encoded on the subscriber's voice. An index sent to the cellular carrier at call set-up identifies which message to expect. If the message steganographically decoded by the cellular carrier from the subscriber's voice does not match that expected, the call is identified as fraudulent.

In the preferred form of the invention, the steganographic encoding relies on a pseudo random data signal to transform the message or identification data into a low level noise-like signal superimposed on the subscriber's digitized voice signal. This pseudo random data signal is known, or knowable, to both the subscriber's telephone (for encoding) and to the cellular carrier (for decoding). Many such embodiments rely on a deterministic pseudo random number generator seeded with a datum known to both the telephone and the carrier. In simple embodiments this seed can remain constant from one call to the next (e.g. a telephone ID number). In more complex embodiments, a pseudo-one-time pad system may be used, wherein a new seed is used for each session (i.e. telephone call). In a hybrid system, the telephone and cellular carrier each have a reference noise key (e.g. 10,000 bits) from which the telephone selects a field of bits, such as 50 bits beginning at a randomly selected offset, and each uses this excerpt as the seed to generate the pseudo random data for encoding. Data sent from the telephone to the carrier (e.g. the offset) during call set-up allows the carrier to reconstruct the same pseudo random data for use in decoding. Yet further improvements can be derived by borrowing basic techniques from the art of cryptographic communications and applying them to the steganographically encoded signal detailed in this disclosure.

Details of applicant's preferred techniques for steganographic encoding/decoding with a pseudo random data stream are more particularly detailed in applicant's prior applications, but the present invention is not limited to use with such techniques. A brief review of other steganographic techniques suitable for use with the present invention follows.

British patent publication 2,196,167 to Thorn EMI discloses a system in which an audio recording is electronically mixed with a marking signal indicative of the owner of the recording, where the combination is perceptually identical to the original. U.S. Pat. Nos. 4,963,998 and 5,079,648 disclose variants of this system.

U.S. Pat. No. 5,319,735 to B.B.N. rests on the same principles as the earlier Thorn EMI publication, but additionally addresses psycho-acoustic masking issues.

U.S. Pat. Nos. 4,425,642, 4,425,661, 5,404,377 and 5,473,631 to Moses disclose various systems for imperceptibly embedding data into audio signals—the latter two patents particularly focusing on neural network implementations and perceptual coding details.

U.S. Pat. No. 4,943,973 to AT&T discloses a system employing spread spectrum techniques for adding a low level noise signal to other data to convey auxiliary data therewith. The patent is particularly illustrated in the context of transmitting network control signals along with digitized voice signals.

U.S. Pat. No. 5,161,210 to U.S. Philips discloses a system in which additional low-level quantization levels are defined on an audio signal to convey, e.g., a copy inhibit code, therewith.

U.S. Pat. No. 4,972,471 to Gross discloses a system intended to assist in the automated monitoring of audio (e.g. radio) signals for copyrighted materials by reference to identification signals subliminally embedded therein.

There are a variety of shareware programs available on the internet (e.g. "Stego" and "White Noise Storm") which generally operate by swapping bits from a to-be-concealed message stream into the least significant bits of an image or audio signal. White Noise Storm effects a randomization of the data to enhance its concealment.

A British company, Highwater FBI, Ltd., has introduced a software product which is said to imperceptibly embed identifying information into photographs and other graphical images. This technology is the subject of European patent applications 9400971.9 (filed Jan. 19, 1994), 9504221.2 (filed Mar. 2, 1995), and 9513790.7 (filed Jul. 3, 1995), the first of which has been laid open as PCT publication WO 95/20291.

Walter Bender at M.I.T. has done a variety of work in the field, as illustrated by his paper "Techniques for Data Hiding," Massachusetts Institute of Technology, Media Laboratory, January 1995.

Dice, Inc. of Palo Alto has developed an audio marking technology marketed under the name Argent. While a U.S. Patent Application is understood to be pending, it has not yet been issued.

Tirkel et al, at Monash University, have published a variety of papers on "electronic watermarking" including, e.g., "Electronic Water Mark," DICTA-93, Macquarie University, Sydney, Australia, December, 1993, pp. 666-673, and "A Digital Watermark," IEEE International Conference on Image Processing, Nov. 13-16, 1994, pp. 86-90.

Cox et al, of the NEC Technical Research Institute, discuss various data embedding techniques in their published NEC technical report entitled "Secure Spread Spectrum Watermarking for Multimedia," December, 1995.

Möller et al. discuss an experimental system for imperceptibly embedding auxiliary data on an ISDN circuit in "Rechnergestutzte Steganographie: Wie sie Funktioniert und warum folglich jede Reglementierung von Verschlusselung unsinnig ist," DuD, Datenschutz und Datensicherung, 18/6 (1994) 318-326. The system randomly picks ISDN signal samples to modify, and suspends the auxiliary data transmission for signal samples which fall below a threshold.

In addition to the foregoing, many of the other cited prior art patents and publications disclose systems for embedding a data signal on an audio signal. These, too, can generally be employed in systems according to the present invention.

The foregoing and additional features and advantages of certain embodiments of the present invention will be more readily apparent from the following detailed description, which proceeds with reference to the accompanying drawings.

DETAILED DESCRIPTION

The reader is presumed to be familiar with cellular communications technologies. Accordingly, details known from prior art in this field aren't belabored herein.

Figure 1:
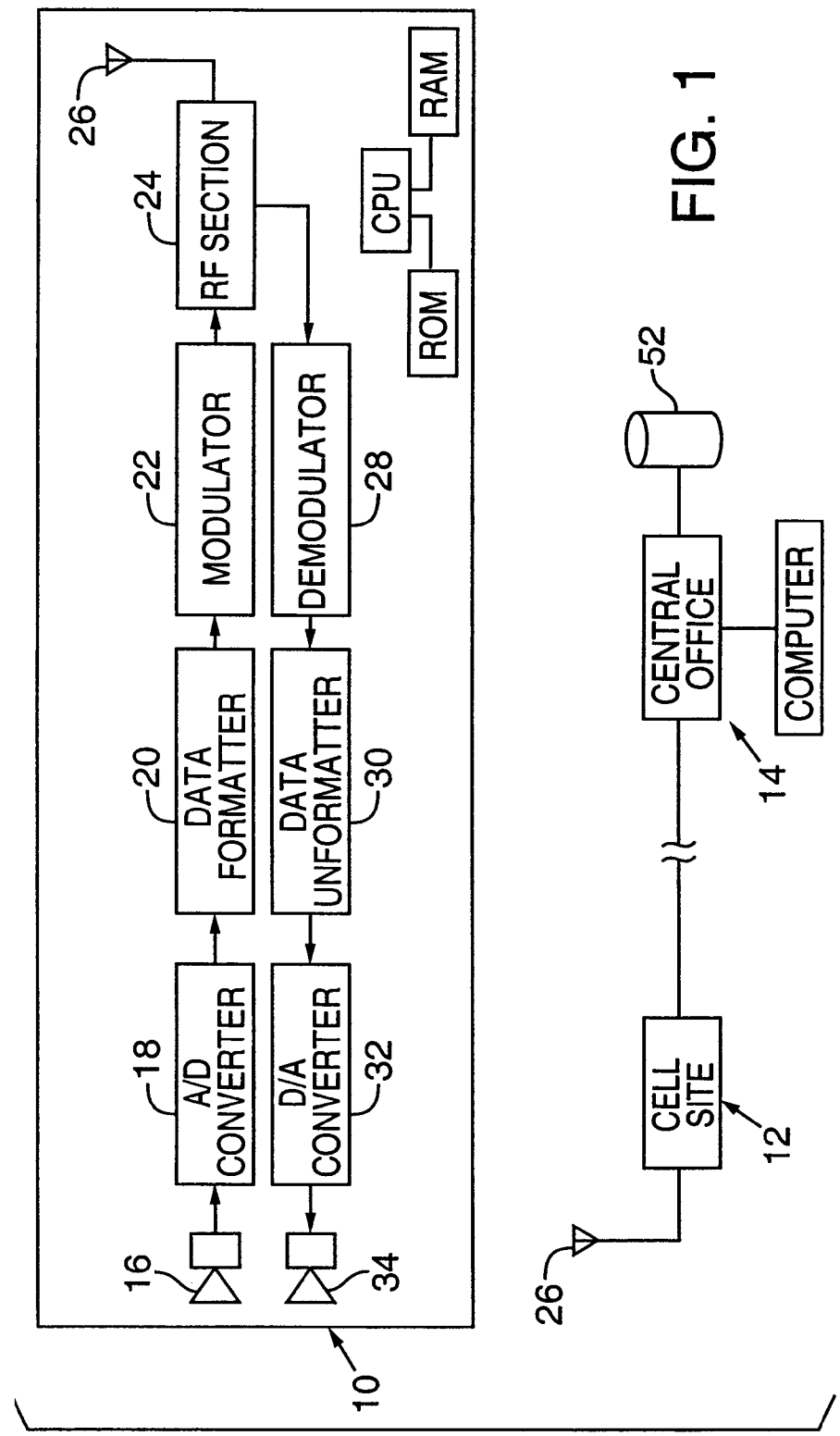
FIG. 1 is a block diagram showing principal components of an exemplary wireless telephony system.

Referring to FIG. 1, an illustrative cellular system includes a telephone 10, a cell site 12, and a central office 14.

Conceptually, the telephone may be viewed as including a microphone 16, an A/D converter 18, a data formatter 20, a modulator 22, an RF section 24, an antenna 26, a demodulator 28, a data unformatter 30, a D/A converter 32, and a speaker 34.

In operation, a subscriber's voice is picked up by the microphone 16 and converted to digital form by the A/D converter 18. The data formatter 20 puts the digitized voice into packet form, adding synchronization and control bits thereto. The modulator 22 converts this digital data stream into an analog signal whose phase and/or amplitude properties change in accordance with the data being modulated. The RF section 24 commonly translates this time-varying signal to one or more intermediate frequencies, and finally to a UHF transmission frequency. The RF section thereafter amplifies it and provides the resulting signal to the antenna 26 for broadcast to the cell site 12.

The process works in reverse when receiving. A broadcast from the cell site is received through the antenna 26. RF section 24 amplifies and translates the received signal to a different frequency for demodulation. Demodulator 28 processes the amplitude and/or phase variations of the signal provided by the RF section to produce a digital data stream corresponding thereto. The data unformatter 30 segregates the voice data from the associated synchronization/control data, and passes the voice data to the D/A converter for conversion into analog form. The output from the D/A converter drives the speaker 34, through which the subscriber hears the other party's voice.

The cell site 12 receives broadcasts from a plurality of telephones 10, and relays the data received to the central office 14. Likewise, the cell site 12 receives outgoing data from the central office and broadcasts same to the telephones.

The central office 14 performs a variety of operations, including call authentication, switching, and cell hand-off.

(In some systems, the functional division between the cell site and the central station is different than that outlined above. Indeed, in some systems, all of this functionality is provided at a single site.)

In an exemplary embodiment of the present invention, each telephone 10 additionally includes a steganographic encoder 36. Likewise, each cell site 12 includes a steganographic decoder 38. The encoder operates to hide an auxiliary data signal among the signals representing the subscriber's voice. The decoder performs the reciprocal function, discerning the auxiliary data signal from the encoded voice signal. The auxiliary signal serves to verify the legitimacy of the call.

Figure 2:
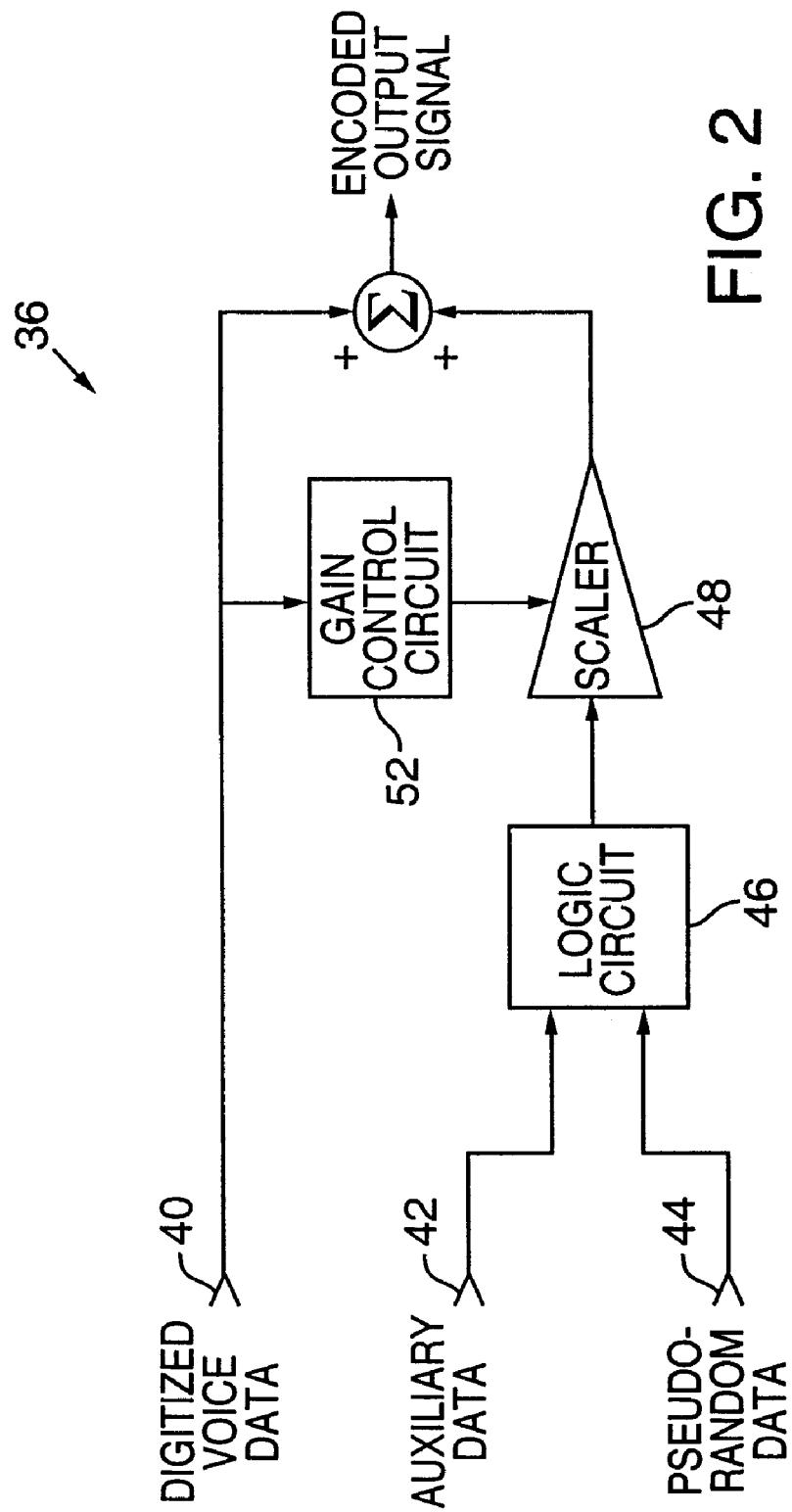
FIG. 2 is a block diagram of an exemplary steganographic encoder that can be used in the telephone of the FIG. 1 system.

An exemplary steganographic encoder 36 is shown in FIG. 2.

The illustrated encoder 36 operates on digitized voice data, auxiliary data, and pseudo-random noise (PRN) data. The digitized voice data is applied at a port 40 and is provided, e.g., from A/D converter 18. The digitized voice may comprise 8-bit samples. The auxiliary data is applied at a port 42 and comprises, in one form of the invention, a stream of binary data uniquely identifying the telephone 10. (The auxiliary data may additionally include administrative data of the sort conventionally exchanged with a cell site at call set-up.) The pseudo-random noise data is applied at a port 44 and can be, e.g., a signal that randomly alternates between "−1" and "1" values. (More and more cellular phones are incorporating spread spectrum capable circuitry, and this pseudo-random noise signal and other aspects of this invention can often "piggy-back" or share the circuitry which is already being applied in the basic operation of a cellular unit).

For expository convenience, it is assumed that all three data signals applied to the encoder 36 are clocked at a common rate, although this is not necessary in practice.

In operation, the auxiliary data and PRN data streams are applied to the two inputs of a logic circuit 46. The output of circuit 46 switches between −1 and +1 in accordance with the following table:

| AUX | PRN | OUTPUT |
| --- | --- | --- |
| 0 | −1 | 1 |
| 0 | 1 | −1 |
| 1 | −1 | −1 |
| 1 | 1 | 1 |

(If the auxiliary data signal is conceptualized as switching between −1 and 1, instead of 0 and 1, it will be seen that circuit 46 operates as a one-bit multiplier.)

The output from gate 46 is thus a bipolar data stream whose instantaneous value changes randomly in accordance with the corresponding values of the auxiliary data and the PRN data. It may be regarded as noise. However, it has the auxiliary data encoded therein. The auxiliary data can be extracted if the corresponding PRN data is known.

The noise-like signal from gate 46 is applied to the input of a scaler circuit 48. Scaler circuit scales (e.g. multiplies) this input signal by a factor set by a gain control circuit 50. In the illustrated embodiment, this factor can range between 0 and 15. The output from scaler circuit 48 can thus be represented as a five-bit data word (four bits, plus a sign bit) which changes each clock cycle, in accordance with the auxiliary and PRN data, and the scale factor. The output from the scaler circuit may be regarded as "scaled noise data" (but again it is "noise" from which the auxiliary data can be recovered, given the PRN data).

The scaled noise data is summed with the digitized voice data by a summer 51 to provide the encoded output signal (e.g. binarily added on a sample by sample basis). This output signal is a composite signal representing both the digitized voice data and the auxiliary data.

The gain control circuit 50 controls the magnitude of the added scaled noise data so its addition to the digitized voice data does not noticeably degrade the voice data when converted to analog form and heard by a subscriber. The gain control circuit can operate in a variety of ways.

One is a logarithmic scaling function. Thus, for example, voice data samples having decimal values of 0, 1 or 2 may be correspond to scale factors of unity, or even zero, whereas voice data samples having values in excess of 200 may correspond to scale factors of 15. Generally speaking, the scale factors and the voice data values correspond by a square root relation. That is, a four-fold increase in a value of the voice data corresponds to approximately a two-fold increase in a value of the scaling factor associated therewith. Another scaling function would be linear as derived from the average power of the voice signal.

(The parenthetical reference to zero as a scaling factor alludes to cases, e.g., in which the digitized voice signal sample is essentially devoid of information content.)

More satisfactory than basing the instantaneous scaling factor on a single voice data sample, is to base the scaling factor on the dynamics of several samples. That is, a stream of digitized voice data which is changing rapidly can camouflage relatively more auxiliary data than a stream of digitized voice data which is changing slowly. Accordingly, the gain control circuit 50 can be made responsive to the first, or preferably the second- or higher-order derivative of the voice data in setting the scaling factor.

In still other embodiments, the gain control block 50 and scaler 48 can be omitted entirely.

(Those skilled in the art will recognize the potential for "rail errors" in the foregoing systems. For example, if the digitized voice data consists of 8-bit samples, and the samples span the entire range from 0 to 255 (decimal), then the addition or subtraction of scaled noise to/from the input signal may produce output signals that cannot be represented by 8 bits (e.g. −2, or 257). A number of well-understood techniques exist to rectify this situation, some of them proactive and some of them reactive. Among these known techniques are: specifying that the digitized voice data shall not have samples in the range of 0-4 or 241-255, thereby safely permitting combination with the scaled noise signal; and including provision for detecting and adaptively modifying digitized voice samples that would otherwise cause rail errors.)

Returning to the telephone 10, an encoder 36 like that detailed above is desirably interposed between the A/D converter 18 and the data formatter 20, thereby serving to steganographically encode all voice transmissions with the auxiliary data. Moreover, the circuitry or software controlling operation of the telephone is arranged so that the auxiliary data is encoded repeatedly. That is, when all bits of the auxiliary data have been encoded, a pointer loops back and causes the auxiliary data to be applied to the encoder 36 anew. (The auxiliary data may be stored at a known address in RAM memory for ease of reference.)

It will be recognized that the auxiliary data in the illustrated embodiment is transmitted at a rate one-eighth that of the voice data. That is, for every 8-bit sample of voice data, scaled noise data corresponding to a single bit of the auxiliary data is sent. Thus, if voice samples are sent at a rate of 4800 samples/second, auxiliary data can be sent at a rate of 4800 bits/second. If the auxiliary data is comprised of 8-bit symbols, auxiliary data can be conveyed at a rate of 600 symbols/second. If the auxiliary data consists of a string of even 60 symbols, each second of voice conveys the auxiliary data ten times. (Significantly higher auxiliary data rates can be achieved by resorting to more efficient coding techniques, such as limited-symbol codes (e.g. 5- or 6-bit codes), Huffman coding, etc.) This highly redundant transmission of the auxiliary data permits lower amplitude scaled noise data to be used while still providing sufficient signal-to-noise headroom to assure reliable decoding—even in the relatively noisy environment associated with radio transmissions.

Figure 3:
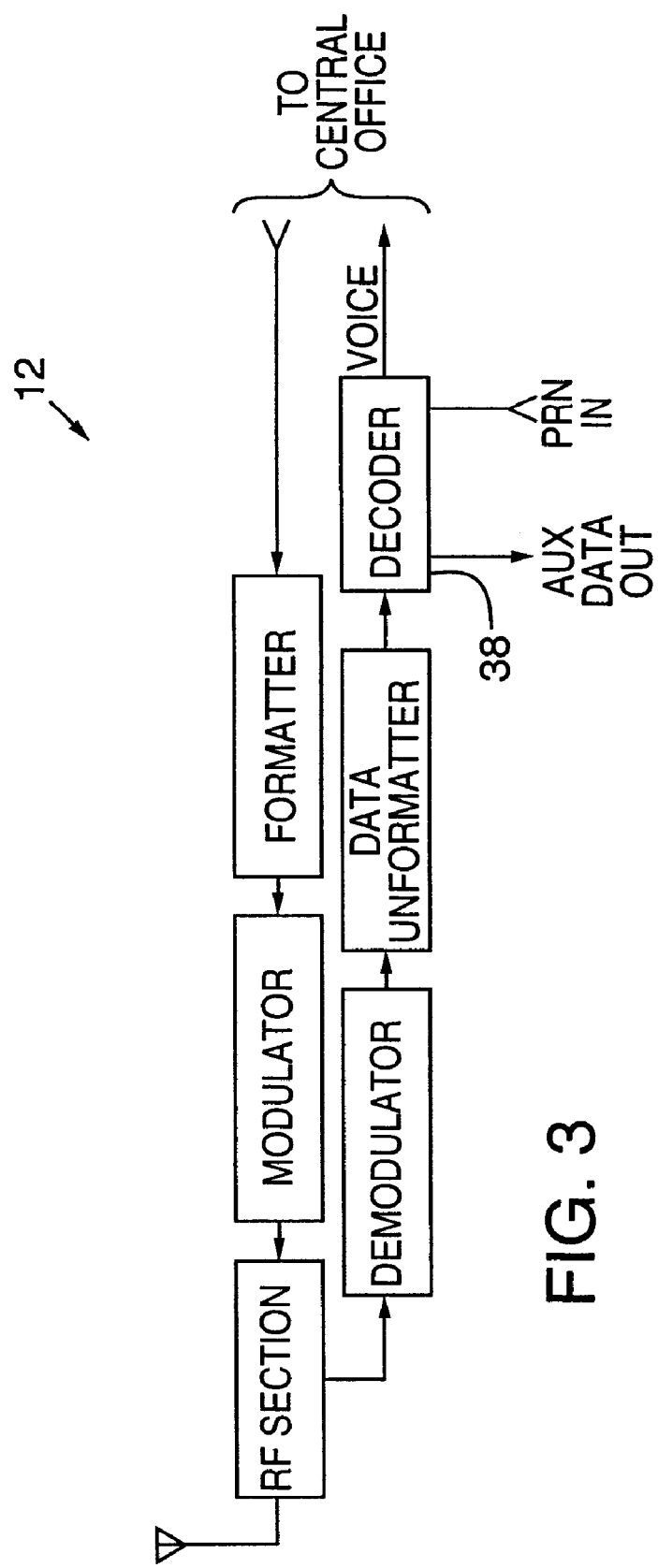
FIG. 3 is a block diagram of an exemplary steganographic decoder that can be used in the cell site of the FIG. 1 system.

Turning now to FIG. 3, each cell site 12 has a steganographic decoder 38 by which it can analyze the composite data signal broadcast by the telephone 10 to discern and separate the auxiliary data and digitized voice data therefrom. (The decoder desirably works on unformatted data (i.e. data with the packet overhead, control and administrative bits removed; this is not shown for clarity of illustration).

The decoding of an unknown embedded signal (i.e. the encoded auxiliary signal) from an unknown voice signal is best done by some form of statistical analysis of the composite data signal.

In one approach, decoding relies on recombining the composite data signal with PRN data (identical to that used during encoding), and analyzing the entropy of the resulting signal. "Entropy" need not be understood in its most strict mathematical definition, it being merely the most concise word to describe randomness (noise, smoothness, snowiness, etc.).

Most serial data signals are not random. That is, one sample usually correlates—to some degree—with adjacent samples. This is true in sampled voice signals.

Noise, in contrast, typically is random. If a random signal (e.g. noise) is added to (or subtracted from) a non-random signal (e.g. voice), the entropy of the resulting signal generally increases. That is, the resulting signal has more random variations than the original signal. This is the case with the composite data signal produced by encoder 36; it has more entropy than the original, digitized voice data.

If, in contrast, the addition of a random signal to (or subtraction from) a non-random (e.g. voice) signal reduces entropy, then something unusual is happening. It is this anomaly that can be used to decode the composite data signal.

To fully understand this entropy-based decoding method, it is first helpful to highlight a characteristic of the original encoding process: the similar treatment of every Nth (e.g. 480th) sample.

In the encoding process discussed above, the auxiliary data is 480 bits long. Since it is encoded repeatedly, every 480th sample of the composite data signal corresponds to the same bit of the auxiliary data. If this bit is a "1", the scaled PRN data corresponding thereto are added to the digitized voice signal; if this bit is a "0", the scaled PRN data corresponding thereto are subtracted. Due to the repeated encoding of the auxiliary data, every 480th sample of the composite data signal thus shares a characteristic: they are all either augmented by the corresponding noise data (which may be negative), or they are all diminished, depending on whether the bit of the auxiliary data is a "1" or a "0".

To exploit this characteristic, the entropy-based decoding process treats every 480th sample of the composite signal in like fashion. In particular, the process begins by adding to the 1st, 481st, 861st, etc. samples of the composite data signal the PRN data with which these samples were encoded. (That is, a set of sparse PRN data is added: the original PRN set, with all but every 480th datum zeroed out.) The localized entropy of the resulting signal around these points (i.e. the composite data signal with every 480th sample modified) is then computed.

(Computation of a signal's entropy or randomness is well understood by artisans in this field. One generally accepted technique is to take the derivative of the signal at each sample point near a point in question (e.g. the modified sample and 4 samples either side), square these values, and then sum the resulting signals over all of the localized regions over the entire signal. A variety of other well known techniques can alternatively be used.)

The foregoing step is then repeated, this time subtracting the PRN data corresponding thereto from the 1st, 481st, 961st, etc. composite data samples.

One of these two operations will counteract (e.g. undo) the encoding process and reduce the resulting signal's entropy; the other will aggravate it. If adding the sparse PRN data to the composite data reduces its entropy, then this data must earlier have been subtracted from the original voice signal. This indicates that the corresponding bit of the auxiliary data signal was a "0" when these samples were encoded. (A "0" at the auxiliary data input of logic circuit 46 caused it to produce an inverted version of the corresponding PRN datum as its output datum, resulting in subtraction of the corresponding PRN datum from the voice signal.)

Conversely, if subtracting the sparse PRN data from the composite data reduces its entropy, then the encoding process must have earlier added this noise. This indicates that the value of the auxiliary data bit was a "1" when samples 1, 481, 961, etc., were encoded.

By noting in which case entropy is lower by (a) adding or (b) subtracting a sparse set of PRN data to/from the composite data, it can be determined whether the first bit of the auxiliary data is (a) a "0", or (b) a "1." (In real life applications, in the presence of various distorting phenomena, the composite signal may be sufficiently corrupted so that neither adding nor subtracting the sparse PRN data actually reduces entropy. Instead, both operations will increase entropy. In this case, the "correct" operation can be discerned by observing which operation increases the entropy less.)

The foregoing operations can then be conducted for the group of spaced samples of the composite data beginning with the second sample (i.e. 2, 482, 962, . . . ). The entropy of the resulting signals indicate whether the second bit of the auxiliary data signal is a "0" or a "1." Likewise with the following 478 groups of spaced samples in the composite signal, until all 480 bits of the code word have been discerned.

It will be appreciated that the foregoing approach is not sensitive to corruption mechanisms that alter the values of individual samples; instead, the process considers the entropy of spaced excerpts of the composite data, yielding a high degree of confidence in the results.

A second and probably more common decoding technique is based on correlation between the composite data signal and the PRN data. Such operations are facilitated in the present context since the auxiliary data whose encoded representation is sought, is known, at least in large part, a priori. (In one form of the invention, the auxiliary data is based on the authentication data exchanged at call set-up, which the cellular system has already received and logged; in another form (detailed below), the auxiliary data comprises a predetermined message.) Thus, the problem can be reduced to determining whether an expected signal is present or not (rather than looking for an entirely unknown signal). Moreover, data formatter 20 breaks the composite data into frames of known length. (In a known GSM implementation, voice data is sent in time slots which convey 114 data bits each.) By padding the auxiliary data as necessary, each repetition of the auxiliary data can be made to start, e.g., at the beginning of such a frame of data. This, too, simplifies the correlation determinations, since 113 of every 114 possible bit alignments can be ignored (facilitating decoding even if none of the auxiliary data is known a priori).

Classically speaking, the detection of the embedded auxiliary data fits nicely into the old art of detecting known signals in noise. Noise in this last statement can be interpreted very broadly, even to the point where the subscriber's voice can be considered noise, relative to the need to detect the underlying auxiliary data. One of many references to this older art is the book Kassam, Saleem A., "Signal Detection in Non-Guassian Noise," Springer-Verlag, 1988 (available at the Library of Congress by catalog number TK5102.5.K357 1988).

In particular, section 1.2 "Basic Concepts of Hypothesis Testing" of Kassam's book lays out the basic concept of a binary hypothesis, assigning the value "1" to one hypothesis and the value "0" to the other hypothesis. The last paragraph of that section is also on point regarding the initial preferred embodiment of this invention, i.e., that the "0" hypothesis corresponds to "noise only" case, whereas the "1" corresponds to the presence of a signal in the observations. In the current preferred embodiment, the case of "noise-only" is effectively ignored, and that an identification process will either come up with our N-bit identification word or it will come up with "garbage."

The continued and inevitable engineering improvement in the detection of embedded code signals will undoubtedly borrow heavily from this generic field of known signal detection. A common and well-known technique in this field is the so-called "matched filter," which is incidentally discussed early in section 2 of the Kassam book. Many basic texts on signal processing include discussions on this method of signal detection. This is also known in some fields as correlation detection. Where, as here, the location of the auxiliary signal is known a priori (or more accurately, known to fall within one of a few discrete locations, as discussed above), then the matched filter can often be reduced to a simple vector dot product between a set of sparse PRN data, and mean-removed excerpts of the composite signal corresponding thereto. (Note that the PRN data need not be sparse and may arrive in contiguous bursts, such as in British patent publication 2,196,167 mentioned earlier wherein a given bit in a message has contiguous PRN values associated with it.) Such a process steps through all 480 sparse sets of PRN data and performs corresponding dot product operations. If the dot product is positive, the corresponding bit of the auxiliary data signal is a "1;" if the dot product is negative, the corresponding bit of the auxiliary data signal is a "0." If several alignments of the auxiliary data signal within the framed composite signal are possible, this procedure is repeated at each candidate alignment, and the one yielding the highest correlation is taken as true. (Once the correct alignment is determined for a single bit of the auxiliary data signal, the alignment of all the other bits can be determined therefrom. "Alignment," perhaps better known as "synchronization," can be achieved by primarily through the very same mechanisms which lock on and track the voice signal itself and allow for the basic functioning of the cellular unit).

Figure 4A:
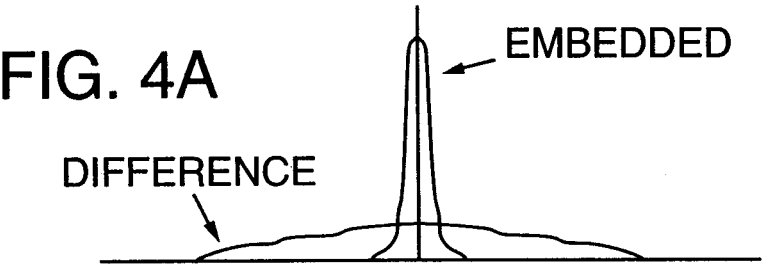
FIGS. 4A and 4B are histograms illustrating signal relationships which may be exploited to facilitate decoding.
Figure 4B:
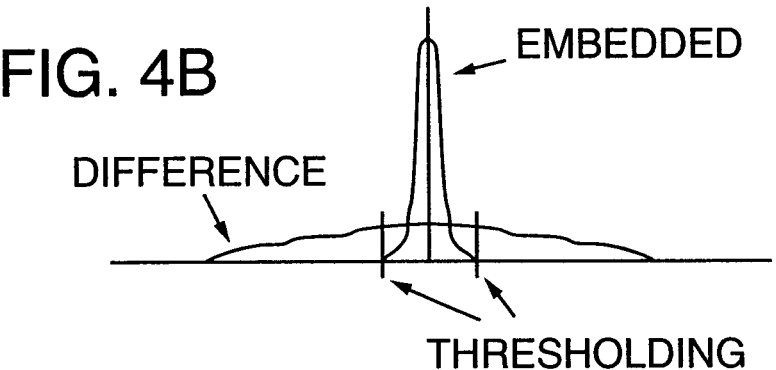

One principle which did not seem to be explicitly present in the Kassam book and which was developed rudimentarily by the inventor involves the exploitation of the magnitudes of the statistical properties of the auxiliary data signal being sought relative to the magnitude of the statistical properties of the composite signal as a whole. In particular, the problematic case seems to be where the auxiliary data signals we are looking for are of much lower level than the noise and corruption present on a difference signal between the composite and digitized voice signals. FIG. 4 attempts to set the stage for the reasoning behind this approach. FIG. 4A contains a generic look at the differences in the histograms between a typical "problematic" difference signal, i.e., a difference signal which has a much higher overall energy than the auxiliary data that may or may not be within it. The term "mean-removed" simply means that the means of both the difference signal and the auxiliary data have been removed, a common operation prior to performing a normalized dot product. FIG. 4B then has a generally similar histogram plot of the derivatives of the two signals. From pure inspection it can be seen that a simple thresholding operation in the derivative transform domain, with a subsequent conversion back into the signal domain, will go a long way toward removing certain innate biases on the dot product "recognition algorithm" of a few paragraphs back. Thresholding here refers to the idea that if the absolute value of a difference signal derivative value exceeds some threshold, then it is replaced simply by that threshold value. The threshold value can be so chosen to contain most of the histogram of the embedded signal.

Another operation which can be of minor assistance in "alleviating" some of the bias effects in the dot product algorithm is the removal of the low order frequencies by, e.g., high pass filtering with a cutoff near the origin.

Security Considerations

Security depends, in large part, on security of the PRN data and/or security of the auxiliary data. In the following discussion, a few of many possible techniques for assuring the security of these data are discussed.

In a first embodiment, each telephone 10 is provided with a long noise key unique to the telephone. This key may be, e.g., a highly unique 10,000 bit string stored in ROM. (In most applications, keys substantially shorter than this may be used.)

The central office 14 has access to a secure disk 52 on which such key data for all authorized telephones are stored. (The disk may be remote from the office itself.)

Each time the telephone is used, fifty bits from this noise key are identified and used as the seed for a deterministic pseudo random number generator. The data generated by this PRN generator serve as the PRN data for that telephone call.

The fifty bit seed can be determined, e.g., by using a random number generator in the telephone to generate an offset address between 0 and 9,950 each time the telephone is used to place a call. The fifty bits in the noise key beginning at this offset address are used as the seed.

During call setup, this offset address is transmitted by the telephone, through the cell site 12, to the central office 14. There, a computer at the central office uses the offset address to index its copy of the noise key for that telephone. The central office thereby identifies the same 50 bit seed as was identified at the telephone. The central office 14 then relays these 50 bits to the cell site 12, where a deterministic noise generator like that in the telephone generates a PRN sequence corresponding to the 50 bit key and applies same to its decoder 38.

By the foregoing process, the same sequence of PRN data is generated both at the telephone and at the cell site. Accordingly, the auxiliary data encoded on the voice data by the telephone can be securely transmitted to, and accurately decoded by, the cell site. If this auxiliary data does not match the expected auxiliary data (e.g. data transmitted at call setup), the call is flagged as fraudulent and appropriate remedial action is taken.

It will be recognized that an eavesdropper listening to radio transmission of call set-up information can intercept only the randomly generated offset address transmitted by the telephone to the cell site. This data, alone, is useless in pirating calls. Even if the hacker had access to the signals provided from the central office to the cell site, this data too is essentially useless: all that is provided is a 50 bit seed. Since this seed is different for nearly each call (repeating only 1 out of every 9,950 calls), it too is unavailing to the hacker.

In a related system, the entire 10,000 bit noise key can be used as a seed. An offset address randomly generated by the telephone during call set-up can be used to identify where, in the PRN data resulting from that seed, the PRN data to be used for that session is to begin. (Assuming 4800 voice samples per second, 4800 PRN data are required per second, or about 17 million PRN data per hour. Accordingly, the offset address in this variant embodiment will likely be far larger than the offset address described above.)

In this variant embodiment, the PRN data used for decoding is preferably generated at the central station from the 10,000 bit seed, and relayed to the cell site. (For security reasons, the 10,000 bit noise key should not leave the security of the central office.)

In variants of the foregoing systems, the offset address can be generated by the central station or at the cell site, and relayed to the telephone during call set-up, rather than vice versa.

In another embodiment, the telephone 10 may be provided with a list of one-time seeds, matching a list of seeds stored on the secure disk 52 at the central office. Each time the telephone is used to originate a new call, the next seed in the list is used. By this arrangement, no data needs to be exchanged relating to the seed; the telephone and the carrier each independently know which seed to use to generate the pseudo random data sequence for the current session.

In such an embodiment, the carrier can determine when the telephone has nearly exhausted its list of seeds, and can transmit a substitute list (e.g. as part of administrative data occasionally provided to the telephone). To enhance security, the carrier may require that the telephone be returned for manual reprogramming, to avoid radio transmission of this sensitive information. Alternatively, the substitute seed list can be encrypted for radio transmission using any of a variety of well known techniques.

In a second class of embodiments, security derives not from the security of the PRN data, but from security of the auxiliary message data encoded thereby. One such system relies on transmission of a randomly selected one of 256 possible messages.

In this embodiment, a ROM in the telephone stores 256 different messages (each message may be, e.g., 128 bits in length). When the telephone is operated to initiate a call, the telephone randomly generates a number between 1 and 256, which serves as an index to these stored messages. This index is transmitted to the cell site during call set-up, allowing the central station to identify the expected message from a matching database on secure disk 52 containing the same 256 messages. (Each telephone has a different collection of messages.) (Alternatively, the carrier may randomly select the index number during call set-up and transmit it to the telephone, identifying the message to be used during that session.) In a theoretically pure world where proposed attacks to a secure system are only mathematical in nature, much of these additional layers of security might seem superfluous. (The addition of these extra layers of security, such as differing the messages themselves, simply acknowledge that the designer of actual public-functioning secure systems will face certain implementation economics which might compromise the mathematical security of underlying principles of such embodiments, and thus these auxiliary layers of security may afford new tools against the inevitable attacks on implementation).

Thereafter, all voice data transmitted by the telephone for the duration of that call is steganographically encoded with the indexed message. The cell site checks the data received from the telephone for the presence of the expected message. If the message is absent, or if a different message is decoded instead, the call is flagged as fraudulent and remedial action is taken.

In this second embodiment, the PRN data used for encoding and decoding can be as simple or complex as desired. A simple system may use the same PRN data for each call. Such data may be generated, e.g., by a deterministic PRN generator seeded with fixed data unique to the telephone and known also by the central station (e.g. a telephone identifier), or a universal noise sequence can be used (i.e. the same noise sequence can be used for all telephones). Or the pseudo random data can be generated by a deterministic PRN generator seeded with data that changes from call to call (e.g. based on data transmitted during call set-up identifying, e.g., the destination telephone number, etc.). Some embodiments may seed the pseudo random number generator with data from a preceding call (since this data is necessarily known to the telephone and the carrier, but is likely not known to pirates).

Naturally, elements from the foregoing two approaches can be combined in various ways, and supplemented by other features. The foregoing embodiments are exemplary only, and do not begin to catalog the myriad approaches which may be used. Generally speaking, any data which is necessarily known or knowable by both the telephone and the cell site/central station, can be used as the basis for either the auxiliary message data, or the PRN data by which it is encoded.

Since the illustrative embodiments each redundantly encodes the auxiliary data throughout the duration of the subscriber's digitized voice, the auxiliary data can be decoded from any brief sample of received audio. In one embodiment, the carrier repeatedly checks the steganographically encoded auxiliary data (e.g. every 10 seconds, or at random intervals) to assure that it continues to have the expected attributes.

While the foregoing discussion has focused on steganographically encoding a transmission from a cellular telephone, it will be recognized that transmissions to a cellular telephone can be steganographically encoded as well. Such arrangements find applicability, e.g., in conveying administrative data (i.e. non-voice data) from the carrier to individual telephones. This administrative data can be used, for example, to reprogram parameters of targeted cellular telephones (or all cellular telephones) from a central location, to update seed lists (for systems employing the above-described on-time pad system), to apprise "roaming" cellular telephones of data unique to an unfamiliar local area, etc.

In some embodiments, the carrier may steganographically transmit to the cellular telephone a seed which the cellular phone is to use in its transmissions to the carrier during the remainder of that session.

While the foregoing discussion has focused on steganographic encoding of the baseband digitized voice data, artisans will recognize that intermediate frequency signals (whether analog or digital) can likewise be steganographically encoded in accordance with principles detailed herein. An advantage of post-baseband encoding is that the bandwidth of these intermediate signals is relatively large compared with the baseband signal, allowing more auxiliary data to be encoded therein, or allowing a fixed amount of auxiliary data to be repeated more frequently during transmission. (If steganographic encoding of an intermediate signal is employed, care should be taken that the perturbations introduced by the encoding are not so large as to interfere with reliable transmission of the administrative data, taking into account any error correcting facilities supported by the packet format).

Those skilled in the art will recognize that the auxiliary data, itself, can be arranged in known ways to support error detecting, or error correcting capabilities by the decoder 38. The interested reader is referred, e.g., to Rorabaugh, Error Coding Cookbook, McGraw Hill, 1996, one of many readily available texts detailing such techniques.

While the preferred embodiment is illustrated in the context of a cellular system utilizing packetized data, other wireless systems do not employ such conveniently framed data. In systems in which framing is not available as an aid to synchronization, synchronization marking can be achieved within the composite data signal by techniques such as that detailed in applicant's prior applications. In one class of such techniques, the auxiliary data itself has characteristics facilitating its synchronization. In another class of techniques, the auxiliary data modulates one or more embedded carrier patterns which are designed to facilitate alignment and detection.

As noted earlier, the principles detailed herein are not restricted to use with the particular forms of steganographic encoding detailed above. Indeed, any steganographic encoding technique previously known, or hereafter invented, can be used in the fashion detailed above to enhance the security or functionality of cellular (or other wireless, e.g. PCS) communications systems. Likewise, these principles are not restricted to wireless telephones; any wireless transmission may be provided with an "in-band" channel of this type.

It will be recognized that systems for implementing the detailed embodiments can comprise dedicated hardware circuit elements, but more commonly comprise suitably programmed microprocessors with associated RAM and ROM memory (e.g. one such system in each of the telephone 10, cell-site 12, and central office 14).

Errata

Applicant is preparing a steganographic marking/decoding "plug-in" for use with Adobe Photoshop software. The latest version of this software, presented as commented source code, is attached as Appendix B to U.S. Pat. No. 5,822,436. The code was written for compilation with Microsoft's Visual C++ compiler, version 4.0, and can be understood by those skilled in the art.

This source code embodies several improvements to the technology disclosed in applicant's prior applications, both in encoding and decoding, and also in user interface.

Applicant's copyrights in the Exhibit B code are reserved, save for permission to reproduce same as part of the specification of the patent.

While the Exhibit B software is particularly designed for the steganographic encoding and decoding of auxiliary data in/from two-dimensional image data, many principles thereof are applicable to the encoding of digitized audio.

Before concluding, it may be instructive to review some of the other fields where principles of applicant's technology (both in this application, and prior applications) can be employed.

One is document security for passports, visas, "green cards," etc. The photos on such documents can be processed to embed a subliminal data signal therein, serving to authenticate the document.

Related to the foregoing are objects (e.g. photos and ID cards) having biometric data embedded therein. One example of such biometric data is a fingerprint, allowing the authenticity of a person bearing such an ID to be checked.

Another application is smart business cards, wherein a business card is provided with a photograph having unobtrusive, machine-readable contact data embedded therein. (The same function can be achieved by changing the surface microtopology of the card to embed the data therein.)

Yet another promising application is in content regulation. Television signals, images on the internet, and other content sources (audio, image, video, etc.) can have data indicating their "appropriateness" (i.e. their rating for sex, violence, suitability for children, etc.) actually embedded in the content itself rather than externally associated therewith. Television receivers, web browsers, etc., can discern such appropriateness ratings (e.g. by use of universal code decoding) and can take appropriate action (e.g. not permitting viewing of an image or video, or play-back of an audio source).

Credit cards are also likely candidates for enhancement by use of steganographic marking, providing an invisible and covert data carrier to extend functionality and improve security.

The field of merchandise marking is generally well served by familiar bar codes and universal product codes. However, in certain applications, such bar codes are undesirable (e.g. for aesthetic considerations, or where security is a concern). In such applications, applicant's technology may be used to mark merchandise, either through in innocuous carrier (e.g. a photograph associated with the product), or by encoding the microtopology of the merchandise's surface, or a label thereon.

There are applications—too numerous to detail—in which steganography can advantageously be combined with encryption and/or digital signature technology to provide enhanced security.

Medical records appear to be an area in which authentication is important. Steganographic principles—applied either to film-based records or to the microtopology of documents—can be employed to provide some protection against tampering.

Many industries, e.g. automobile and airline, rely on tags to mark critical parts. Such tags, however, are easily removed, and can often be counterfeited. In applications wherein better security is desired, industrial parts can be steganographically marked to provide an inconspicuous identification/authentication tag.

In various of the applications reviewed above and in applicant's earlier applications, different messages can be steganographically conveyed by different regions of an image (e.g. different regions of an image can provide different internet URLs, or different regions of a photocollage can identify different photographers). Likewise with other media (e.g. sound).

Some software visionaries look to the data when data blobs will roam the datawaves an interact with other data blobs. In such era, it will be necessary that such blobs have robust and incorruptible ways to identify themselves. Steganographic techniques again hold much promise here.

Finally, message changing codes—recursive systems in which steganographically encoded messages actually change underlying steganographic code patterns—offer new levels of sophistication and security. Such message changing codes are particularly well suited to applications such as plastic cash cards where time-changing elements are important to enhance security.

Again, while applicant prefers the particular forms of steganographic encoding, the foregoing applications (and applications disclosed in applicant's prior applications) can be practiced with other steganographic marking techniques.

Having described and illustrated the principles of my invention with reference to various embodiments thereof, it should be apparent that the invention can be modified in arrangement and detail without departing from such principles. Moreover, a variety of enhancements can be incorporated from the teachings of my prior applications.

Accordingly, I claim as my invention all such embodiments as come within the scope and spirit of the following claims and equivalents thereto.

I claim:

1. A method of steganography usage in a wireless communications device, the method comprising:
   receiving data wirelessly sent from a remote transmitter;
   generating encoding data that depends on the received data wirelessly sent from the remote location;
   altering digital data in accordance with the encoding data to yield steganographically-encoded data; and
   wirelessly transmitting the steganographically-encoded data from the wireless communications device to a remote location.

2. A method of steganography usage in a wireless communications device, the method comprising:
   generating encoding data, by reference to input digital data and to plural-bit auxiliary data, that represents the plural-bit auxiliary data and that depends, in part, on the input digital data;
   altering the input digital data in accordance with the encoding data to yield steganographically-encoded data; and
   wirelessly transmitting from the wireless communications device the steganographically-encoded data to a remote location.

3. A method of steganography usage in a wireless communications device, the method comprising:
   wirelessly communicating plural-bit auxiliary data from the wireless communications device to a remote location; and
   separately, conveying at least a portion of the plural-bit auxiliary data from the wireless communications device to the remote location through use of steganographic encoding of information data transmitted by the wireless communications device, wherein the at least a portion of the plural-bit auxiliary data is sent from the wireless communications device in two different manners.

4. A method of steganography usage in a wireless communications device, the method comprising:
   steganographically encoding information with first encoding data;
   transmitting the steganographically-encoded information from the wireless communications device;
   steganographically encoding the information with second encoding data different than the first;
   transmitting the steganographically-encoded information with the second encoding data from the wireless communications device, wherein the first and second encoding data differ by reason of at least one of the following:
   different first and second data wirelessly received by the wireless communications device from a remote location, wherein the encoding data depends on the first and second data; or
   the first encoding data encodes a first identifier, and the second encoding data also encodes the first identifier, but represents the first identifier with a different encoding than the first encoding data.

5. A method of steganography usage in a wireless communications device, the method comprising:
   processing information data to steganographically encode the information data with auxiliary data, wherein the auxiliary data comprises an identifier; and
   transmitting from the wireless communications device the steganographically-encoded information data, wherein the identifier comprises data uniquely identifying the wireless communications device.

6. A tangible computer-readable medium having instructions stored thereon that, when executed by a wireless communications device, cause the wireless communications device to perform operations comprising:
   receiving data wirelessly sent from a remote transmitter;
   generating an encoding data that depends on the received data wirelessly sent from the remote location;
   altering digital data in accordance with the encoding data to yield steganographically-encoded data; and
   wirelessly transmitting the steganographically-encoded data to a remote location.

7. A wireless communications device comprising:
   a receiver configured to receive data wirelessly sent from a remote transmitter;
   a processor configured to:
      generate an encoding data that depends on the received data wirelessly sent from the remote location; and
      alter digital data in accordance with the encoding data to yield steganographically-encoded data; and
   a transmitter configured to wirelessly transmit the steganographically- encoded data to a remote location.

8. A tangible computer-readable medium having instructions stored thereon that, when executed by a wireless communications device, cause the wireless communications device to perform operations comprising:
   generating an encoding data, by reference to input digital data and to plural-bit auxiliary data, that represents the plural-bit auxiliary data and that depends, in part, on the input digital data;
   altering the input digital data in accordance with the encoding data to yield steganographically-encoded data; and
   wirelessly transmitting the steganographically-encoded data to a remote location.

9. A wireless communications device comprising:
   a processor configured to:
      generate an encoding data, by reference to input digital data and to plural-bit auxiliary data, that represents the plural-bit auxiliary data and that depends, in part, on the input digital data; and
      alter the input digital data in accordance with the encoding data to yield steganographically-encoded data; and
   a transmitter configured to wirelessly transmit the steganographically- encoded data to a remote location.

10. A tangible computer-readable medium having instructions stored thereon that, when executed by a wireless communications device, cause the wireless communications device to perform operations comprising:
   wirelessly communicating plural-bit auxiliary data to a remote location; and
   communicating at least a portion of the plural-bit auxiliary data to the remote location through use of steganographic encoding of information data, wherein the at least a portion of the plural-bit auxiliary data is sent in two different manners.

11. A wireless communications device comprising:
   a transmitter configured to:
      wirelessly communicate plural-bit auxiliary data to a remote location; and
      communicate at least a portion of the plural-bit auxiliary data to the remote location through use of steganographic encoding of information data, wherein the at least a portion of the plural-bit auxiliary data is sent in two different manners.

12. A tangible computer-readable medium having instructions stored thereon that, when executed by a wireless communications device, cause the wireless communications device to perform operations comprising:
- steganographically encoding information with a first encoding data;
- transmitting the steganographically-encoded information;
- steganographically encoding the information with a second encoding data different than the first;
- transmitting the steganographically-encoded information with the second encoding data, wherein the first and second encoding data differ by reason of at least one of the following:
- different first and second data wirelessly received from a remote location, wherein the encoding data depends on the first and second data; or
- the first encoding data encodes a first identifier, and the second encoding data also encodes the first identifier, but represents the first identifier with a different encoding than the first encoding data.

13. A wireless communications device comprising:
- a processor configured to:
  - steganographically encode information with a first encoding data; and
  - steganographically encode the information with a second encoding data different than the first; and
- a transmitter configured to:
  - transmit the steganographically-encoded information; and
  - transmit the steganographically-encoded information with the second encoding data, wherein the first and second encoding data differ by reason of at least one of the following:
  - different first and second data wirelessly received from a remote location, wherein the encoding data depends on the first and second data; or
  - the first encoding data encodes a first identifier, and the second encoding data also encodes the first identifier, but represents the first identifier with a different encoding than the first encoding data.

14. A tangible computer-readable medium having instructions stored thereon that, when executed by a wireless communications device, cause the wireless communications device to perform operations comprising:
- processing information data to steganographically encode the information data with auxiliary data, wherein the auxiliary data comprises an identifier; and
- transmitting the steganographically-encoded information data, wherein the identifier comprises data uniquely identifying the wireless communications device.

15. A wireless communications device comprising:
- a processor configured to:
  - process an information data to steganographically encode the information data with auxiliary data, wherein the auxiliary data comprises an identifier; and
- a transmitter configured to transmit the steganographically-encoded information data, wherein the identifier comprises data uniquely identifying the wireless communications device.

* * * * *

UNITED STATES PATENT AND TRADEMARK OFFICE
CERTIFICATE OF CORRECTION

| | | |
|---|---|---|
| PATENT NO. | : 8,027,663 B2 | Page 1 of 1 |
| APPLICATION NO. | : 11/875551 | |
| DATED | : September 27, 2011 | |
| INVENTOR(S) | : Rhoads | |

It is certified that error appears in the above-identified patent and that said Letters Patent is hereby corrected as shown below:

Column 16, lines 23-24, in Claim 7, delete "steganographically- encoded" and insert
-- steganographically-encoded --.

Column 16, lines 46-47, in Claim 9, delete "steganographically- encoded" and insert
-- steganographically-encoded --.

Signed and Sealed this
Twentieth Day of March, 2012

David J. Kappos
*Director of the United States Patent and Trademark Office*